(12) United States Patent
Visconti

(10) Patent No.: US 6,729,623 B2
(45) Date of Patent: May 4, 2004

(54) SEALING ASSEMBLY FOR TWO RELATIVELY ROTATING MEMBERS, IN PARTICULAR THE TWO RINGS OF A ROLLING-CONTACT BEARING

(75) Inventor: Alberto Visconti, Varese (IT)

(73) Assignee: RFT S.p.A., Turin (IT)

( * ) Notice: Subject to any disclaimer, the term of this patent is extended or adjusted under 35 U.S.C. 154(b) by 0 days.

(21) Appl. No.: 09/906,751

(22) Filed: Jul. 18, 2001

(65) Prior Publication Data

US 2002/0024181 A1 Feb. 28, 2002

(30) Foreign Application Priority Data

Jul. 19, 2000 (IT) ................................. MI2000A1636

(51) Int. Cl.[7] ............................................. F16J 15/32
(52) U.S. Cl. ..................... 277/549; 277/501; 277/551
(58) Field of Search ............................. 277/549, 551, 277/501

(56) References Cited

U.S. PATENT DOCUMENTS

| | | | | |
|---|---|---|---|---|
| 3,708,177 A | * | 1/1973 | Baermann | 277/378 |
| 4,770,425 A | * | 9/1988 | Colanzi et al. | 277/353 |
| 4,874,261 A | * | 10/1989 | Colanzi et al. | 277/574 |
| 4,928,371 A | * | 5/1990 | Colanzi et al. | 29/898.064 |
| 4,991,982 A | * | 2/1991 | Colanzi et al. | 384/486 |
| 5,096,207 A | * | 3/1992 | Seeh et al. | 277/35 |
| 5,522,600 A | * | 6/1996 | Duckwall | 277/38 |
| 6,027,122 A | * | 2/2000 | Bertetti et al. | 277/402 |
| 6,109,794 A | * | 8/2000 | Bertetti et al. | 384/462 |
| 6,170,992 B1 | * | 1/2001 | Angelo et al. | 384/477 |
| 6,401,843 B1 | * | 6/2002 | Besson et al. | 175/359 |

FOREIGN PATENT DOCUMENTS

| | | | |
|---|---|---|---|
| EP | 337321 A2 | * 10/1989 | ............ F16J/15/32 |
| EP | 0 378 939 A1 | * 12/1989 | |
| EP | 0 378 939 A1 | 7/1990 | |
| EP | 458122 A2 | * 11/1991 | ............ F16C/33/78 |
| EP | 464379 A1 | * 1/1992 | ............ F16C/33/78 |
| EP | 0 524 133 A1 | * 1/1993 | |
| EP | 0 870 940 A2 | * 4/1998 | |
| EP | 0 870 940 A2 | 10/1998 | |
| EP | 0 930 505 A1 | * 1/1999 | |
| EP | 0 930 505 A1 | 7/1999 | |
| EP | 0 937 984 A1 | * 8/1999 | |

* cited by examiner

*Primary Examiner*—Robert J. Sandy
*Assistant Examiner*—Thomas Ho
(74) *Attorney, Agent, or Firm*—Burns, Doane, Swecker & Mathis, LLP

(57) ABSTRACT

A sealing assembly for two relatively rotating mechanical members, e.g. the two rings of a rolling-contact bearing, and of the type incorporating a sealing ring and a magnetic ring, both integral with a rigid first shield. The first shield has a radial flange. The sealing assembly also includes a covering of elastomeric material having a base portion extending on one face of the flange. The magnetic ring has an annular surface bonded to the base portion of the covering, and projects axially from the flange. The base portion of the covering is interposed axially between the flange and the magnetic ring, and is shaped to define a deformable locating and supporting mechanism for locating and supporting the magnetic ring.

6 Claims, 1 Drawing Sheet

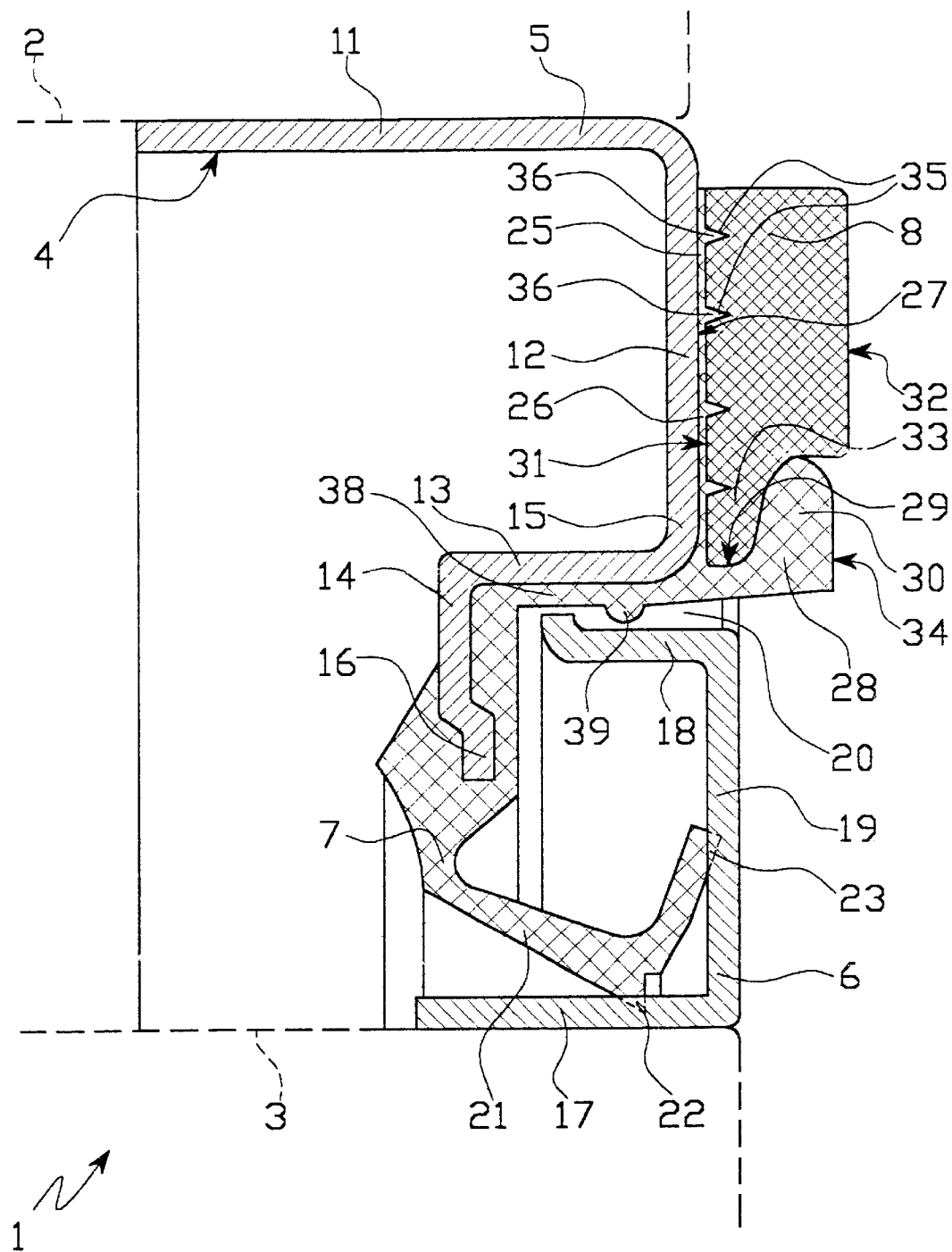

SEALING ASSEMBLY FOR TWO RELATIVELY ROTATING MEMBERS, IN PARTICULAR THE TWO RINGS OF A ROLLING-CONTACT BEARING

The present invention relates to a sealing assembly for two relatively rotating members, in particular the two rings of a rolling-contact bearing, and of the type incorporating a magnetic ring cooperating with a detecting device outside the assembly to detect the relative rotation speed of the two members.

BACKGROUND OF THE INVENTION

Numerous sealing assemblies of the above type are known. In particular, the magnetic ring is known to be fitted directly, with a small amount of interference, to the rotary ring of the bearing or to a rigid metal shield fitted to the ring. Such a solution, however, has the drawbacks of exposing the magnetic ring, especially if made of relatively fragile material, to damage both during assembly and in use; transmitting to the magnetic ring vibration which may impair operation of the detecting device; and failing to withstand other than a limited amount of thermal expansion (due to the different expansion coefficients of the magnet and bearing materials) and mechanical stress (shock).

SUMMARY OF THE INVENTION

It is an object of the present invention to provide a sealing assembly incorporating a magnetic ring and designed to eliminate the aforementioned drawbacks. More specifically, it is an object of the invention to provide a sealing assembly which is effective, is cheap and easy to produce, is extremely compact, and in which operation of the indicating member remains fully reliable.

According to the present invention, there is provided a sealing assembly for two relatively rotating mechanical members, in particular the two rings of a rolling-contact bearing, and of the type comprising a first shield for integral connection to a first of said mechanical members; a sealing ring carried by said first shield and cooperating in fluidtight manner with a second shield connectable to a second of said mechanical members; and a magnetic ring carried by said first shield; said first shield having a radial flange and a covering of elastomeric material extending at least partly on one face of said flange; and the sealing assembly being characterized in that said magnetic ring projects axially from said face of the flange; said covering comprising a base portion interposed axially between said flange and said magnetic ring, and deformable locating and supporting means for locating and supporting said magnetic ring; and an annular surface of said magnetic ring being bonded to said base portion of the covering.

As such, the magnetic ring is not connected directly to a rigid member, and is therefore unaffected by vibration or stress, which are damped by the covering of elastomeric material. At the same time, the magnetic ring is favourably located to ensure correct operation of the detecting device, and the assembly as a whole is extremely compact, particularly axially; the sealing assembly according to the invention is quick and easy to assemble; and different types of magnetic rings, in particular made of magnetic mixture or plastic ferrite, can be used.

BRIEF DESCRIPTION OF THE DRAWING

A non-limiting embodiment of the present invention will be described by way of example with reference to the accompanying drawing, which shows a schematic radial section of a sealing assembly in accordance with the invention.

DETAILED DESCRIPTION OF THE INVENTION

Number 1 in the accompanying drawing indicates a sealing assembly for two relatively rotating members—in the example shown, the outer ring 2 and inner ring 3 of a known rolling-contact bearing not shown in detail for the sake of simplicity. In the following description, outer ring 2 is considered rotary, and inner ring 3 fixed, though this in no way limits the scope of the invention. Sealing assembly 1 is located between rings 2, 3 to close the gap 4 between them in fluidtight manner, and comprises two substantially rigid shields 5, 6 (e.g. defined by metal supports) connected integrally to rings 2, 3 respectively; an annular sealing ring 7 made of elastomeric material, carried by shield 5, and cooperating in fluidtight manner with shield 6; and a magnetic ring 8 made of known magnetic material (e.g. a magnetic mixture or plastic ferrite), also carried by shield 5, and cooperating with a known external detecting device (not shown) to determine the relative rotation speed of rings 2, 3.

Shield 5 comprises a first sleeve-shaped portion 11 fitted to ring 2; a first flange 12 extending radially inwards from an axial end of sleeve-shaped portion 11, and supporting magnetic ring 8; a second sleeve-shaped portion 13; and a radial second flange 14. Sleeve-shaped portion 13 extends axially from a radially inner edge 15 of flange 12, on the same side as sleeve-shaped portion 11; and flange 14 defines a free end 16 of shield 5, from which extends sealing ring 7, which is, for example, co-molded and bonded during curing to shield 5.

Shield 6 is substantially C-shaped, and comprises two coaxial cylindrical portions 17, 18 connected by a radial-flange portion 19. Cylindrical portion 17 is fitted to ring 3; cylindrical portion 18 is positioned facing and a small radial distance from sleeve-shaped portion 13 of shield 5, with which it defines an annular channel 20; and radial-flange portion 19 is substantially aligned with flange 12 of shield 5.

Sealing ring 7 is shaped to comprise a sealing portion 21 projecting from free end 16 of shield 5 and having two sealing lips 22, 23 fitted with a given interference so as to cooperate in sliding manner, in use, with cylindrical portion 17 and radial-flange portion 19 of shield 6 respectively.

Shield 5 has a covering 25 of elastomeric material formed, for example, in one piece with sealing ring 7 and therefore also co-molded and bonded to shield 5 during curing. Covering 25 comprises a base portion 26 defined by a thin layer of elastomeric material covering the face 27 of flange 12 on the opposite side to sleeve-shaped portions 11, 13; and an annular projection 28 projecting axially from base portion 26 at the end of flange 12 defined by radially inner edge 15. Annular projection 28 has a circumferential seat 29 defined axially by base portion 26 and by a circumferential projection 30, which projects radially from the free end of annular projection 28, faces base portion 26, and has a rounded peripheral end edge.

Magnetic ring 8 is defined axially by two flat parallel annular surfaces 31, 32, and has a radially inner peripheral edge 33 thinner than magnetic ring 8 and inserted inside circumferential seat 29. Annular surface 31 of magnetic ring 8 contacts and is bonded to the base portion 26 of covering 25 on face 27 of flange 12; and magnetic ring 8 projects axially beyond annular projection 28, with annular surface 32 projecting axially beyond an end edge 34 of annular projection 28.

Magnetic ring 8 therefore projects axially from face 27 of flange 12, on the opposite side to sleeve-shaped portion 11, base portion 26 of covering 25 being interposed axially between flange 12 and magnetic ring 8; and annular projection 28 of covering 25 defines deformable locating and supporting means for locating and supporting magnetic ring 8.

According to the invention, magnetic ring 8 is bonded to base portion 26 of covering 25 via the interposition of a known adhesive, or by co-molding the material of magnetic ring 8 directly with the elastomeric material of covering 25, so as to bond the two materials during curing.

To assist adhesion of annular surface 31 to base portion 26, annular surface 31 comprises a number of, e.g. circumferential, grooves 35 in which are inserted corresponding projections 36 of base portion 26.

In the preferred embodiment shown, sealing ring 7 comprises a connecting portion 38 between base portion 26 and sealing portion 21; and the portion of connecting portion 38 covering sleeve-shaped portion 13 of shield 5 has a circumferential bead 39 projecting radially from connecting portion 38 into annular channel 20 and towards cylindrical portion 18 of shield 6 to define a labyrinth seal with shield 6.

Peripheral edge 33 of magnetic ring 8 is insertable inside circumferential seat 29 by annular projection 28 and circumferential projection 30 being deformable elastically, and this by virtue of annular projection 28 projecting from flange 12 with no rigid radial support. Insertion of magnetic ring 8 is also assisted by the rounded profile of circumferential projection 30.

Annular projection 28 provides for locating magnetic ring 8 during assembly, and for holding annular surface 31 against base portion 26 pending completion of the bonding stage (that is, while the adhesive is drying).

Clearly, further changes may be made to the sealing assembly as described and illustrated herein without, however, departing from the scope of the present invention.

What is claimed is:

1. A sealing assembly for two relatively rotating mechanical members, comprising: a first shield for integral connection to a first of said mechanical members; a sealing ring carried by said first shield and cooperating in a fluidtight manner with a second shield connectable to a second of said mechanical members; and a magnetic ring carried by said first shield;

said first shield comprising a first sleeve-shaped portion for connection to the first mechanical member, a flange extending radially inward from an axial end of said first sleeve-shaped portion, and a second sleeve-shaped portion extending axially from an radially inner edge of said flange on a same side as said first sleeve-shaped portion;

a covering of elastomeric material extending at least partly on one face of said flange and comprising a base portion defined by a layer of elastomeric material on said face of said flange on a side opposite said first and second sleeve-shaped portions, and an annular projection projecting axially from said base portion at an end of said flange defined by said radially inner edge, said annular projection having a circumferential seat defined axially by said base portion and by a circumferential projection which projects radially from a free end of said annular projection and faces said base portion;

said magnetic ring projecting axially from said face of the flange with the base portion of said covering interposed axially between said flange and said magnetic ring, said magnetic ring being bonded to said base portion of the covering either by adhesive or by co-molding material forming the magnetic ring with the elastomeric material forming the covering, said magnetic ring having a radially inner peripheral edge positioned in said circumferential seat, said radially inner peripheral edge of said magnetic ring being thinner than a remainder of said magnetic ring, and said magnetic ring projecting axially beyond a free end edge of said annular projection.

2. A sealing assembly as claimed in claim 1, wherein said annular surface of the magnetic ring that is bonded to the base portion of the covering has a number of grooves.

3. A sealing assembly as claimed in claim 2, wherein said base portion of the covering is provided with projections engaging said grooves.

4. A sealing assembly as claimed in claim 1, wherein said covering of elastomeric material and said sealing ring are formed in one piece.

5. A sealing assembly as claimed in claim 1, wherein said sealing ring projects from a free end of said first shield and comprises a sealing portion cooperating in a sliding manner with said second shield.

6. A sealing assembly as claimed in claim 5, wherein said sealing ring also comprises a connecting portion between said base portion of the covering and said sealing portion, said connecting portion having a circumferential bead projecting towards said second shield to define a labyrinth seal with said second shield.

\* \* \* \* \*